(12) United States Patent
Zhao et al.

(10) Patent No.: US 11,358,663 B2
(45) Date of Patent: Jun. 14, 2022

(54) MINIATURE WALKING ROBOT WITH SOFT JOINTS AND LINKS

(71) Applicant: COLORADO STATE UNIVERSITY RESEARCH FOUNDATION, Fort Collins, CO (US)

(72) Inventors: Jianguo Zhao, Fort Collins, CO (US); Anthony Robert Demario, Fort Collins, CO (US)

(73) Assignee: COLORADO STATE UNIVERSITY RESEARCH FOUNDATION, Fort Collins, CO (US)

( * ) Notice: Subject to any disclaimer, the term of this patent is extended or adjusted under 35 U.S.C. 154(b) by 116 days.

(21) Appl. No.: 16/530,420

(22) Filed: Aug. 2, 2019

(65) Prior Publication Data
US 2020/0039590 A1 Feb. 6, 2020

Related U.S. Application Data

(60) Provisional application No. 62/713,808, filed on Aug. 2, 2018.

(51) Int. Cl.
| | |
|---|---|
| *B62D 57/032* | (2006.01) |
| *F16H 1/00* | (2006.01) |
| *B25J 9/10* | (2006.01) |
| *B25J 9/16* | (2006.01) |
| *B33Y 80/00* | (2015.01) |

(52) U.S. Cl.
CPC .......... *B62D 57/032* (2013.01); *B33Y 80/00* (2014.12); *B25J 9/109* (2013.01); *B25J 9/1605* (2013.01); *F16H 1/00* (2013.01)

(58) Field of Classification Search
CPC .................................................. B62D 57/032
See application file for complete search history.

(56) References Cited

U.S. PATENT DOCUMENTS 6,478,314 B1  11/2002  Klann

OTHER PUBLICATIONS

O Antonescu et al 2016 IOP Conf. Ser.: Mater. Sci. Eng. 147 012081 (Year: 2016).*
Megaro, V., Zehnder, J., Bächer, M., Coros, S., Gross, M. H., & Thomaszewski, B. (2017). A computational design tool for compliant mechanisms. ACM Trans. Graph., 36(4), 82-1. (Year: 2017).*
Baisch, A. T., Ozcan, O., Goldberg, B., Ithier, D., and Wood, R. J., 2014, "High Speed Locomotion for a Quadrupedal Microrobot," Int. J. Rob. Res., 33(8), pp. 1063-1082.

(Continued)

*Primary Examiner* — Jacob J Cigna
(74) *Attorney, Agent, or Firm* — Meunier Carlin & Curfman LLC

(57) ABSTRACT

Disclosed is multimaterial 3D printing (MM3P) to fabricate centimeter-scale robots by utilizing soft materials to create soft joints to replace revolute joints and also soft links to replace rigid links. A three-spring rotational-prismatic rotational (RPR) model is developed to approximate the motion of soft joints or links, which is further utilized to numerically predict the motion of the leg mechanism with multiple soft joints and links. The accuracy of the proposed numerical method is validated with experimental results. A functional walking robot actuated by a single DC motor is demonstrated.

23 Claims, 12 Drawing Sheets

(56) References Cited

OTHER PUBLICATIONS

Bartlett, N. W., Tolley, M. T., Overvelde, J. T., Weaver, J. C., Mosadegh, B., Bertoldi, K., Whitesides, G. M., and Wood, R. J., 2015, "A 3D-Printed, Functionally Graded Soft Robot Powered by Combustion," Science, 349(6244), pp. 161-165.
Behbahani, S. B., and Tan, X., 2016, "Design and Modeling of Flexible Passive Rowing Joint for Robotic Fish Pectoral Fins," IEEE Trans. Rob., 32(5), pp. 1119-1132.
Bejgerowski, W., Gerdes, J. W., Gupta, S. K., and Bruck, H. A., 2011, "Design and Fabrication of Miniature Compliant Hinges for Multi-Material Compliant Mechanisms," Int. J. Adv. Manuf. Technol., 57(5-8), p. 437-452.
Bejgerowski, W., Gerdes, J. W., Gupta, S. K., Bruck, H. A., and Wilkerson, S., 2010, "Design and Fabrication of a Multi-Material Compliant Flapping Wing Drive Mechanism for Miniature Air Vehicles," ASME Paper No. DETC2010-28519.
Belfiore, N. P., and Simeone, P., 2013, "Inverse Kinetostatic Analysis of Compliant Four-Bar Linkages," Mech. Mach. Theory, 69, pp. 350-372.
Birkmeyer, P., Peterson, K., and Fearing, R. S., 2009, "DASH: A Dynamic 16 g Hexapedal Robot," IHHE/RSJ International Conference on Intelligent Robots and Systems (IROS), St. Louis, MO, Oct. 10-15, pp. 2683-2689.
Bruyas, A., Geiskopf, F., and Renaud, P., 2015, "Design and Modeling of a Large Amplitude Compliant Revolute Joint: The Helical Shape Compliant Joint," ASME J. MeCh. Des., 137(8), p. 085003.
Bruyas, A., Geiskopf, F., and Renaud, P., 2015, "Toward Unibody Robotic Structures With Integrated Functions Using Multimaterial Additive Manufacturing: Case Study of an MRI-Compatible Interventional Device," IEEE/RSJ International Conference on Intelligent Robots and Systems (IROS), Hamburg, Germany, Sep. 28-Oct. 2, pp. 1744-1750.
Chen, T., Mueller, J., and Shea, K., 2017, "Integrated Design and Simulation of Tunable, Multi-State Structures Fabricated Monolithically With Multi-Material 3D Printing," Sci. Rep., 7, p. 45671.
Cutkosky, M. R., and Kim. S., 2009, "Design and Fabrication of Multi-Material Structures for Bioinspired Robots," Philos. Trans. R. Soc. London A, 367(1894), pp. 1799-1813.
Dado, M. H., 2005, "Limit Position Synthesis and Analysis of Compliant 4-Bar Mechanisms With Specified Energy Levels Using Variable Parametric Pseudo-Rigid-Body Model," Mech. Mach. Theory, 40(8), pp. 977-992.
DeMario, A., and Zhao, J., 2017, "A Miniature, 3D-Printed, Walking Robot With Soft Joints," ASME Paper No. DETC2017-68182.
Dollar, A. M., and Howe, R. D., 2006, "A Robust Compliant Grasper Via Shape Deposition Manufacturing," IEEE/ASME Trans. Mechatronics, 11(2), pp. 154-161.
Gaynor, A. T., Meisel, N. A., Williams, C. B., and Guest, J. K., 2014, "Multiple-Material Topology Optimization of Compliant Mechanisms Created Via Polyjet Three-Dimensional Printing," ASME J. Manuf. Sci. Eng., 136(6), p. 061015.
Hoover, A. M., Steltz, E., and Fearing, R. S., 2008, "RoACH: An Autonomous 2.4 g Crawling Hexapod Robot," IEEE/RSJ International Conference on Intelligent Robots and Systems (IROS), Nice, France, Sep. 22-26, pp. 26-33.

Kalisky, T., Wang, Y., Shih, B., Drotman, D., Jadhav, S., Aronoff-Spencer, E., and Tolley, M. T., 2017, "Differential Pressure Control of 3D Printed Soft Fluidic Actuators," IEEE/RSJ International Conference on Intelligent Robots and Systems (IROS), Vancouver, BC, Canada, Sep. 24-28, pp. 6207-6213.
Kim, S., Clark, J. E., and Cutkosky, M. R., 2006, "iSprawl: Design and Tuning for High-Speed Autonomous Open-Loop Running," Int. J. Rob. Res., 25(9), pp. 903-912.
Kohut, N. J., Hoover, A. M., Ma, K. Y., Baek, S. S., and Fearing, R. S., 2011, "MEDIC: A Legged Millirobot Utilizing Novel Obstacle Traversal," IEEE International Conference on Robotics and Automation (ICRA), Shanghai, China, May 9-13, pp. 802-808.
Ma, K. Y., Chirarattananon, P., Fuller, S. B., and Wood, R. J., 2013, "Controlled Flight of a Biologically Inspired, Insect-Scale Robot," Science, 340(6132), pp. 603-607.
Morita, K., and Ishihara, H., 2006, "Proposal of 4-Leg Locomotion by Phase Change," Climbing and Walking Robots, Springer, Berlin, pp. 517-524.
Overvelde, J. T., Weaver, J. C., Hoberman, C., and Bertoldi, K., 2017, "Rational Design of Reconfigurable Prismatic Architected Materials," Nature, 541(7637), pp. 347-352.
Pierre, R. S., and Bergbreiter, S., 2017, "Gait Exploration of Sub-2 g Robots Using Magnetic Actuation," IEEE Rob. Autom. Lett., 2(1), pp. 34-40.
She, Y., Su, H.-J., Meng, D., Song, S., and Wang, J., 2018, "Design and Modeling of a Compliant Link for Inherently Safe Corobots," ASME J. Mech. Rob., 10(1), p. 011001.
Sheba, J. K., Elara, M. R., Mart_inez-Garc_ia, E., and Tan-Phuc, L., 2017, "Synthesizing Reconfigurable Foot Traces Using a Klann Mechanism," Robotica, 35(1), pp. 189-205.
Stilli, A., Wurdemann, H. A., and Althoefer, K., 2017, "A Novel Concept for Safe, Stiffness-Controllable Robot Links," Soft Rob., 4(1), pp. 16-22.
Su, H.-J., 2009, "A Psuedorigid-Body 3R Model for Determining Large Deflection of Cantilever Beams Subject to Tip Loads," ASME J. Mech. Rob., 1(2), p. 021008.
Tari, H., and Su, H.-J., 2011, "A Complex Solution Framework for the Kinetostatic Synthesis of a Compliant Four-Bar Mechanism," Mech. Mach. Theory, 46(8), pp. 1137-1152.
Venkiteswaran, V. K., and Su, H.-J., 2016, "A Three-Spring Pseudorigid-Body Model for Soft Joints With Significant Elongation Effects," ASME J. Mech. Rob., 8(6), p. 061001.
Venkiteswaran, V. K., and Su, H.-J., 2016, "Extension Effects in Compliant Joints and Pseudo-Rigid-Body Models," ASME J. Mech. Des., 138(9), p. 092302.
Vogtmann, D. E., Gupta, S. K., and Bergbreiter, S., 2011, "Multi-Material Compliant Mechanisms for Mobile Millirobots," IEEE International Conference on Robotics and Automation (ICRA), Shanghai, China, May 9-13, pp. 3169-3174.
Vogtmann, D. E., Gupta, S. K., and Bergbreiter, S., 2013, "Characterization and Modeling of Elastomeric Joints in Miniature Compliant Mechanisms," ASME J. Mech. Rob., 5(4), p. 041017.
Wood, R., Avadhanula, S., Sahai, R., Steltz, E., and Fearing, R., 2008, "Microrobot Design Using Fiber Reinforced Composites," ASME J. Mech. Des., 130(5), p. 052304.
Zhao, J., Xu, J., Gao, B., Xi, N., Cintron, F., Mutka, M., and Xiao, L., 2013, "MSU Jumper: A Single-Motor-Actuated Miniature Steerable Jumping Robot," IEEE Trans. Rob., 29(3), pp. 602-614.

\* cited by examiner

MINIATURE WALKING ROBOT WITH SOFT JOINTS AND LINKS

CROSS-REFERENCE TO RELATED APPLICATIONS

This application claims the benefit of priority to U.S. Provisional Application No. 62/713,808 filed Aug. 2, 2018, the disclosure of which is incorporated herein by reference in its entirety.

BACKGROUND OF THE INVENTION

Field of the Invention

Embodiments of the present invention relate to a miniature robot, specifically a walking robot, and more specifically to a miniature walking robot fabricated at least partially by 3D printing.

Background

Miniature robots with a size of a few centimeters have a wide variety of applications. Equipped with appropriate sensors (e.g., cameras), they can be deployed in disaster areas to search for survivors. With their small sizes providing good camouflage, they are ideal platforms for military surveillance. Since they can be built with relatively low costs, many of them can also be deployed to form mobile sensor networks for dynamic environmental monitoring. Due to their advantages, many small robots that can walk, crawl, and fly have been built in recent years. The principles of the present disclosure are described with respect to the RoACH robot, actuated with shape memory alloy coils and with a size of 3 cm and a mass of 2.4 g, can walk with hexapedal legs at a speed of 3 cm/s, but such principles are not limited to this exemplary application. Later, the same group improved their design to be able to overcome obstacles. They have also designed a DC motor actuated version called DASH, which can run at a speed up to 150 cm/s. The HAMR robot is driven by piezoelectric actuators and has a mass of 1.7 g and a body length of 4.7 cm. With six legs made of flexure-based spherical five-bar mechanisms, it can locomote at a speed of 44 cm/s. A 1.6 g, 2 cm quadrupedal robot with external magnetic actuations is developed to explore various gaits for insect-size miniature robots. To build these small robots, new fabrication methods have been proposed to create mechanisms with rigid links and soft joints. Smart composite microstructures process is developed to fabricate the RoACH, DASH, and the HAMR. This process sandwiches sheets of flexible material between sheets of rigid materials, for which the flexible material becomes rotational joints, while rigid materials form the links. Shape deposition manufacturing has been employed to fabricate parts with multiple materials by first depositing and then removing appropriate materials in sequence. This method has been used to fabricate robotic hands and running robots. Multimaterial molding is developed with multiple steps of molding to combine soft materials with rigid materials, which has been used for flapping-wing robots. Recently, a laser cut elastomer refill (LaCER) method was proposed to fabricate miniature compliant mechanisms by first using lasers to cut rigid materials and then filling selectively removed sections with elastomer materials. This method has been employed to fabricate miniature walking robots.

Due to the advantage of MM3P, it has recently been utilized in building novel devices and robots. Gaynor et al. have investigated the compliant mechanisms enabled by MM3P and the associated optimization problems. Bruyas et al. have designed a soft revolute joint with a large amplitude using MM3P and built an interventional device using several such joints. Using MM3P, Bartlett et al. have developed a jumping robot that has a rigid core but a soft exterior with multiple soft materials. Similarly, Kalisky et al. have leveraged MM3P to develop a walking robot with three pneumatic-driven soft legs. Behbahani and Tan have utilized MM3P for the pectoral fins of robotic fish. In addition to robotics, MM3P has also recently been utilized for multistable structures that can be deployed into different shapes as well as reconfigurable metamaterials. To date, MM3P has not been used to fabricate mechanical mechanisms, which are essential to generate motions for robotic locomotion. Specific issues for generating trajectories for the For example, the trajectories for walking robots needs to be generated from some mechanisms.

BRIEF SUMMARY OF THE DISCLOSURE

Accordingly, the present invention is directed to a miniature walking robot with soft joints and links that obviates one or more of the problems due to limitations and disadvantages of the related art.

In accordance with the purpose(s) of this invention, as embodied and broadly described herein, this invention, in one aspect, relates robot, comprising: a drive train; four legs, four drive links, each drive link respectively coupling a respective leg to the drive train; and a gear motor coupled to the drive train; the legs and the links being formed by 3D printing to be a unitary structure.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the miniature walking robot with soft joints and links, as well as the structure and operation of the various embodiments of the miniature walking robot with soft joints and links, are described in detail below with reference to the accompanying drawings.

It is to be understood that both the foregoing general description and the following detailed description are exemplary and explanatory only and are not restrictive of the invention as claimed.

BRIEF DESCRIPTION OF THE DRAWINGS

The accompanying figures, which are incorporated herein and form part of the specification, illustrate a miniature walking robot with soft joints and links. Together with the description, the figures further serve to explain the principles of the miniature walking robot with soft joints and links described herein and thereby enable a person skilled in the pertinent art to make and use the miniature walking robot with soft joints and links.

DETAILED DESCRIPTION

Figure 1:
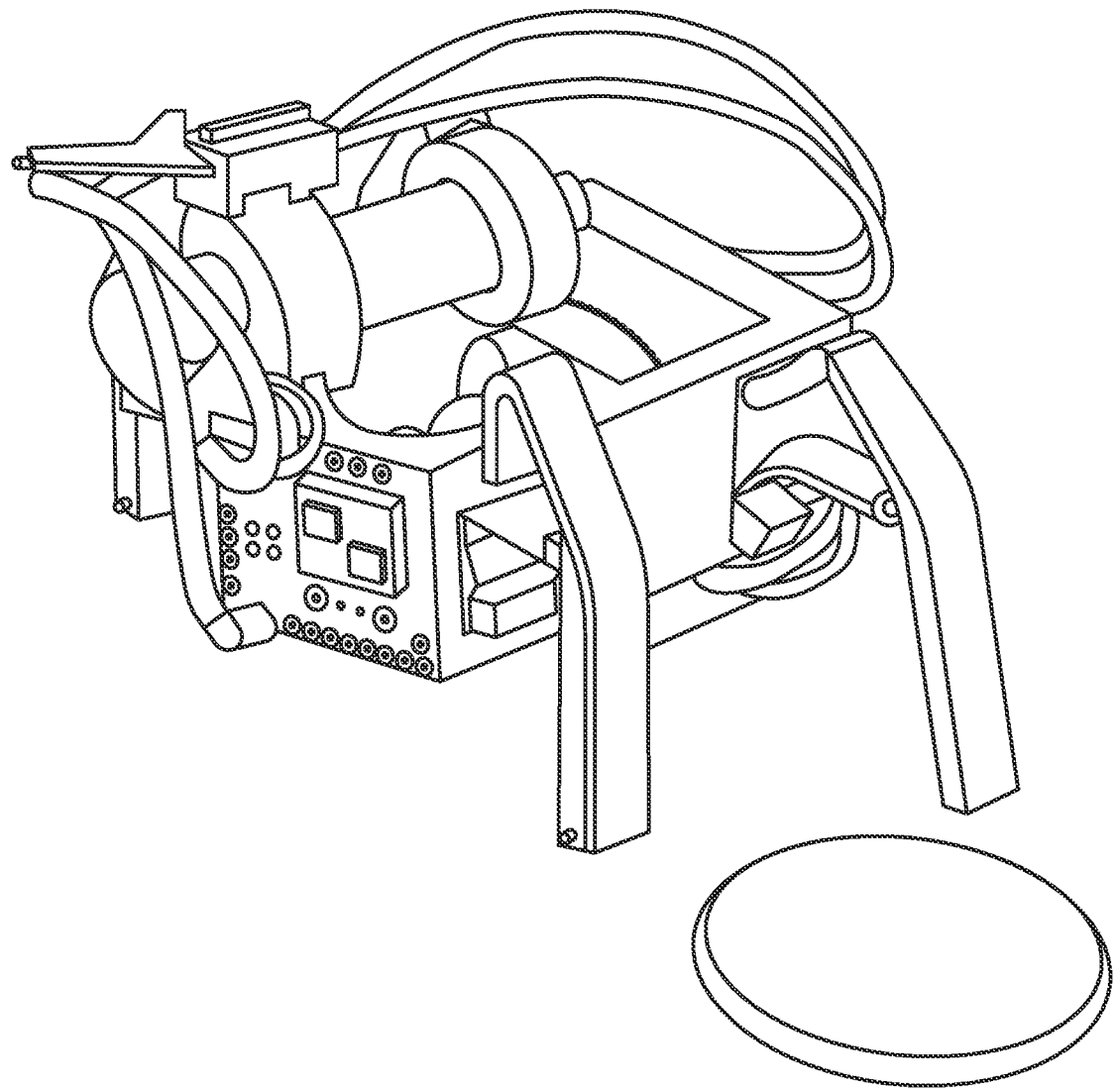
FIG. 1 illustrates a miniature walking robot, according to principles described herein next to a U.S. penny for perspective.

Reference will now be made in detail to embodiments of the miniature walking robot with soft joints and links with reference to the accompanying figures, in which like reference numerals indicate like elements.

Miniature robots have many applications ranging from military surveillance to search and rescue in disaster areas. Nevertheless, the fabrication of such robots has traditionally been labor-intensive and time-consuming. The present disclosure proposes to directly leverage multimaterial 3D printing (MM3P) to fabricate centimeter-scale robots by utilizing soft materials to replace revolute joints but also soft links to replace rigid links. The present disclosure describes using numerical methods to allow use MM3P to create a miniature, four-legged walking robot. A functional walking robot actuated by a single DC motor is demonstrated with a locomotion speed of 5.7 cm/s. According to principles described herein, miniature mechanisms for a wide range of applications including robotics, deployable structures, or mechanical metamaterials are possible. The proposed numerical method can also be readily applied to analyze other mechanisms with soft joints and links.

The present disclosure leverages multimaterial 3D printing (MM3P) technology (e.g., PolyJet, Stratasys, Ltd., Eden Prairie, Minn.) to create a new miniature walking robot (a prototype is shown in FIG. 1) with the majority of the robot being printed as a single part. The robot is enabled by four linkages as four legs. The linkages may be identical, but this is not necessary and will depend on the gait desired. By actuating the four legs with different phases using a single DC motor, the robot can walk on the ground. Moreover, with different linkage dimensions, a variety of foot trajectories can be realized for each leg. Two robots with the same design but different fabrications are described herein. For the first robot, each linkage is fabricated with a soft material for joints and a rigid material for links. For the second robot, in addition to using a soft material for joints, some links are also printed with soft materials. Compared to existing fabrication methods, directly using MM3P has two distinctive advantages. First, the fabrication process is without human intervention, and thus easier and faster. In fact, with appropriate designs, multimaterial 3D printers can directly print both soft and rigid materials in a single part. Second, a variety of materials can be chosen for different performance requirements. For example, there exist seven soft materials with different tensile strength for PolyJet printing (e.g., over-mold materials 27A, 40A, 50A, 60A, etc.). As a result, 3D printed soft joints or links can have different characteristics depending on design requirements.

As described herein, a robot having both soft joints and links for mechanisms and demonstrate the concept with a functional walking robot prototype fabricated using MM3P. Mechanisms with both soft joints and links will improve the life cycle of compliant mechanisms, as the flexibility of soft links can reduce the force exerted on soft joints. Therefore, such mechanisms will be more robust and reliable for a wide range of applications including robotics, deployable structures, or mechanical metamaterials.

Described herein is also a novel numerical method to predict the motion of mechanisms with soft joints and links. The described numerical method can serve as a basis for more general and in-depth theoretical investigations (e.g., dynamics) for mechanisms with soft elements. The present disclosure describes a leg with both soft joints and links and also a more three-spring rotational-prismatic-rotational (RPR) model to resemble a soft joint or link to accommodate the axial deformations. As will be shown in the experimental results, compared with the PRB 1R model, the RPR model is intended to more accurately predict the motion of a mechanism with soft joints and links. Also provided are the design of a walking robot including the leg mechanism, drive train, and gait patterns, and a description of the numerical method based on the three-spring RPR model to predict the motion of mechanisms with soft joints and links. The PRB 1R model used to predict the motion for comparisons is summarized. Comparisons of experimental path to predicted path of the leg mechanism to verify the proposed numerical method is also provided, comparing the RPR model to the PRB 1R model and quantifying the error introduced by each. In addition, the robot's locomotion capabilities are demonstrated.

Biomimetic walking motion with a single actuator driving four legs employs linkages to accomplish the desired trajectory of each leg, as linkages can produce complicated motion if properly designed. In this case, several revolute joints are provided for each leg. To use a single actuator, an appropriate gear train should also be designed to coordinate each leg's motion.

As a miniature robotic platform, the overall size of robot is described in centimeter scale. Such a small size limits the use of traditional revolute joint design because joints with a size of a few millimeters can be expensive and difficult to fabricate. MM3P is described for fabricating a leg mechanism with soft materials serving as the revolute joints. To increase the robustness of the leg, another leg mechanism with not only soft joints, but also soft links may be printed. All the legs can be printed together with the body, resulting in a smaller number of individual parts, which can shorten the time for assembly and reduce the overall complexity of the robot.

Figure 2:
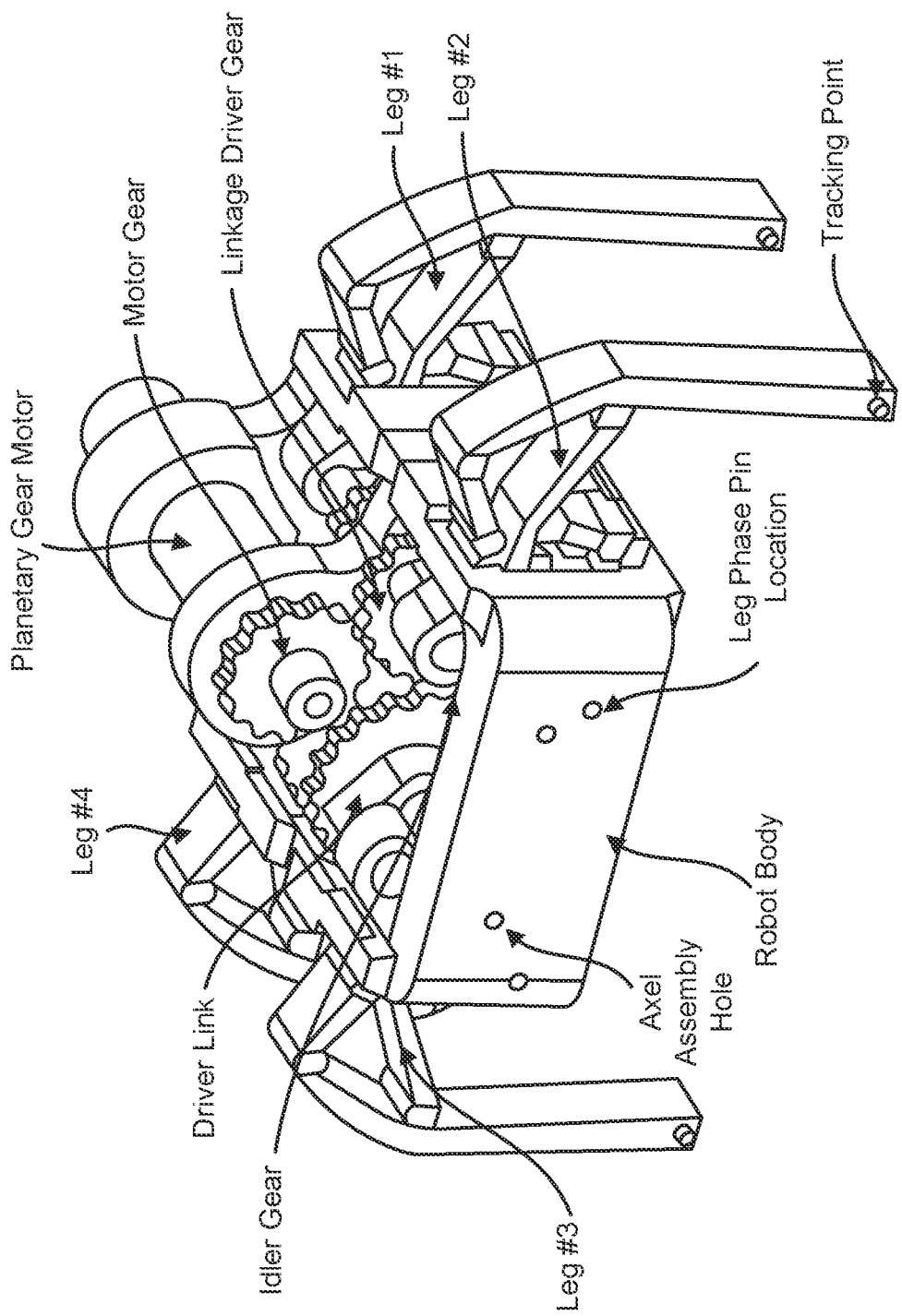
FIG. 2 illustrates a 3D model of a miniature walking robot according to principles described herein.

An exemplary robot according to principles described herein is illustrated in FIG. 2. As illustrated, the exemplary robot has a crab-like stance with four legs, a drive train with six gears, four drive links coupling the legs to the drive train, and a single microplanetary gear DC motor. Although the ultimate goal is to directly print out all the components including the drive train, printing only the robot body together with four legs as a single piece is possible, after which the drive train may be separately assembled.

Figure 3:
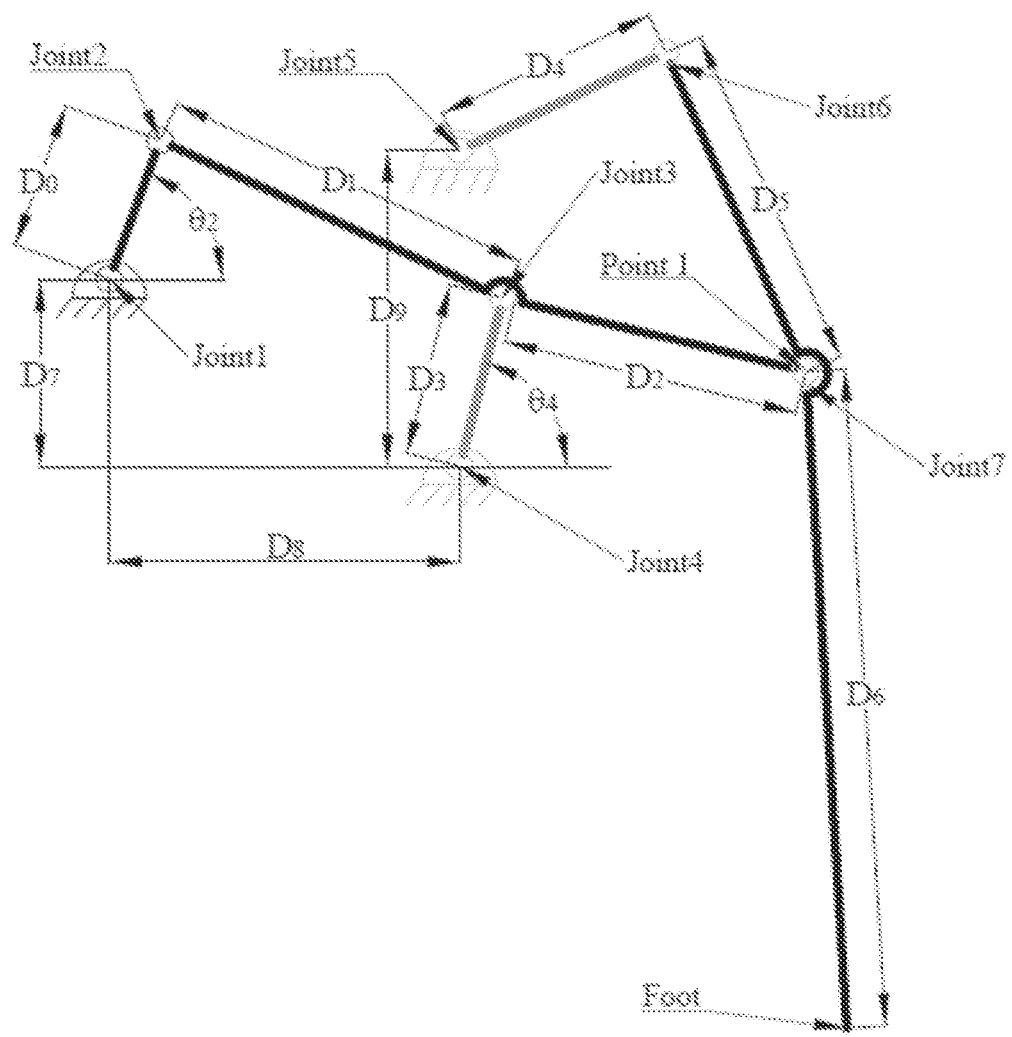
FIG. 3 illustrates a leg mechanism in the walking robot with generic dimension locations according to principles described herein.

A leg mechanism for this robot can simulate the gait of legged animals and can generate various gaits. As shown in FIG. 3, the mechanism contains six links and seven revolute joints. The schematic in FIG. 3 labels all the dimensions and joint numbers in the mechanism. The foot is also highlighted as its trajectories will be analyzed in the modeling section and tracked during experiments.

With Joint 1 as the input joint and D0 as the drive link, the foot will generate a trajectory similar to legged animals. Leg with soft joints: The leg is first investigated with only soft joints. Joint 1 is driven by the output from the drive train, while joint 2 is realized by a pin-hole structure using the drive link in FIG. 2. Except these two joints, all the other five joints (Joints 3-7, FIG. 3) are realized as soft joints (black parts in FIG. 2). To minimize the overall size of the mechanism, reduce the maximum deflection angle of the soft joints, and generate a satisfactory foot path, the dimensions shown in FIG. 3 are chosen as follows:

$D_0$=3.4 mm, $D_1$=8.8 mm, $D_2$=7.3 mm, $D_3$=4.1 mm, $D_4$=5.3 mm, $D_5$=8.1 mm, $D_6$=15.3 mm, $D_7$=4.4 mm, and $D_8$=8.1 mm.

Leg with both soft joints and links: In a single leg mechanism with only soft joints, while the soft joints allow the leg to move through the full range of motion, the adhesion between the soft and rigid materials breaks down after a low number of cycles. To increase the durability of the leg for walking, the same leg design can include two links soft (D3 and D4) in addition to the five soft joints. This modification uses the same geometric dimensions of the leg with soft joints, but it increases the durability of the mechanism. The soft joints can include a flat section on each side to match up with the connection links. The design allows for symmetrical motion as a joint is deformed in both clockwise and counterclockwise directions during one cycle of motion. Each soft joint in the mechanism has the same material and geometry for simpler mathematical modeling. In an exemplary fabrication, all four legs may be printed together with the body using an Objet 500 Connex 31 using PolyJet Flex 27A for soft joints, Polyjet Flex 50A for soft links, and VeroWhitePlus for rigid links and robot structure. The material for soft link is approximately 50% more rigid than the material used for the joints. The Objet 500 has a stated resolution of 600 dpi in both X and Y and 1600 dpi in Z (0.042 mm and 0.016 mm, respectively) and an accuracy of 0.2 mm. With these specifications and taking into account the dimensions of the rigid links and the robot's physical size, the dimensions of the soft joints may be chosen to be as small as possible while still containing enough material to withstand the required deformation and have the desired shape. After testing various sizes, the final dimensions were chosen to be 1.0 mm from link to link, 1.5 mm in width, and 4.0 mm in thickness.

Figure 4:
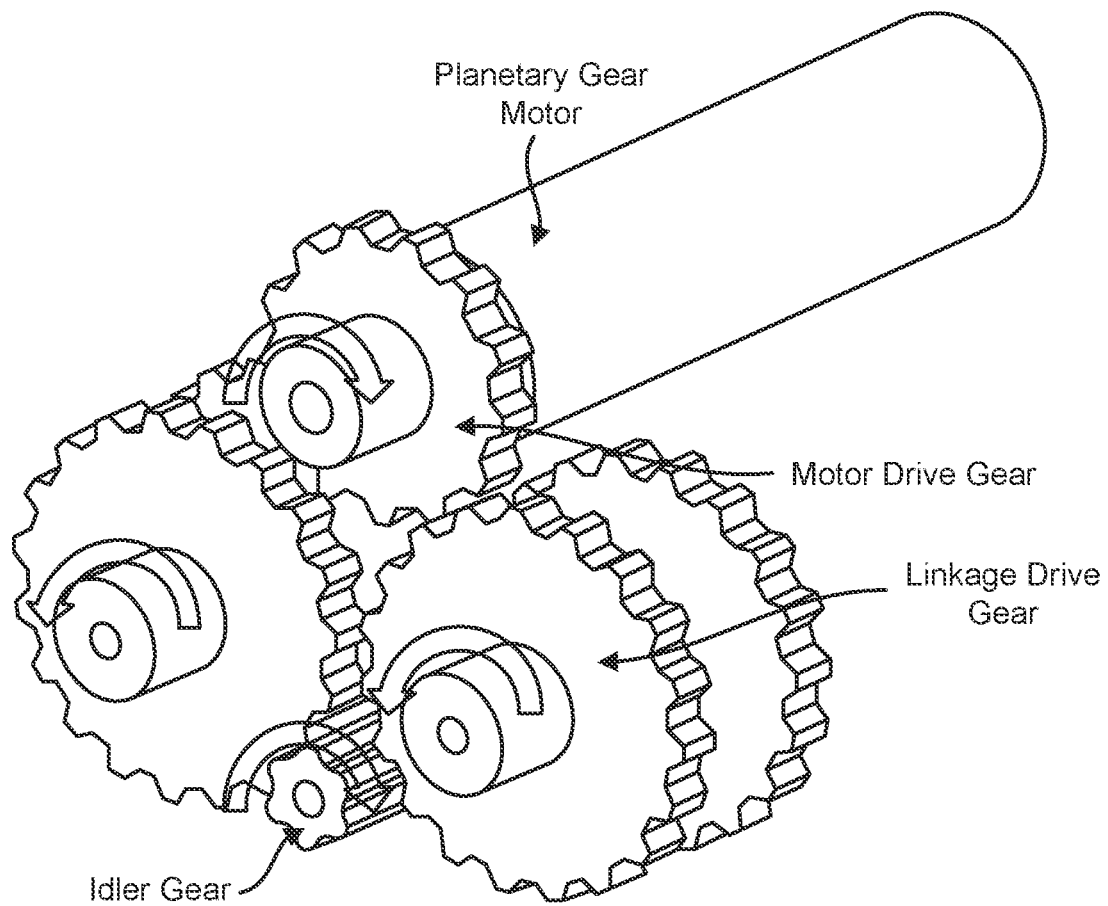
FIG. 4 illustrates an exemplary gear train for use in a miniature robot according to principles described herein.

An exemplary drive train is shown in FIG. 4 and may include six plastic gears transfers power from a DC motor (e.g., Part #: GH612 s, Gizmoszone, Hong Kong, China) to all four legs. At the end of the drive train, each leg is driven by a drive gear (e.g., Part #: GS0.3-36, Gizmoszone) with a 3D-printed drive link (FIG. 2). The beginning of the gear train is the motor gear (e.g., Part #: GS0.3-28, Gizmoszone) which is press-fitted onto the motor shaft. This drives the drive gear for leg 2, which is meshed with the idler gear (e.g., Part #: GS0.3-10, Gizmoszone) located at the bottom of the robot. This idler gear, which spans both sides of the gear train, transfers power not only to leg 3 but also to the other set of legs (legs 1 and 4). The idler gear is used because for forward walking motion (see FIG. 14), legs 1 and 2 are driven counterclockwise while legs 3 and 4 are driven clockwise, in the exemplary embodiment.

According to principles described herein, the foot path of the mechanism can emulate the leg motion of a long-legged animal. This foot path is suited for locomotion with four legs and keeps the leg in contact with the ground for a long time in one motion cycle, which means not much energy is wasted on moving the mechanism off the ground and returning it to the beginning of the cycle.

To continuously walk on the ground, the motion of the four legs should be coordinated. In the exemplary embodiment, the leg phase offset is based on four-legged locomotion, but the devices according to the principles described herein are not so limited. In the exemplary embodiment, each drive link is offset by 90 deg from the other legs. Starting with the leg directly driven by the motor (leg 2) whose drive link is at −90 deg from horizontal, the adjoining leg (leg 1) is offset 180 deg from leg 2 with an angle of +90 deg from the horizontal. Leg 3, which is on the same side of the robot as leg 2, is at 0 deg from horizontal and its adjoining leg (leg 4) is at +180 deg. Such an angle offset is chosen to match the "amble" gait of a legged animal as it keeps two feet on the ground at all times while one is lifting off the ground, and the fourth is returning to the ground. This also allows for a wide range of rotational speed from the motor to drive the legs and still have stable locomotion with minimal rocking. To provide the desired phase angle, four assembly holes are designed into the robot body so that small pins (leg phase pin in FIG. 2) can be used to assemble the drive link with each leg. With such a design, various gait patterns can be investigated by adjusting the location of the assembly holes designed into the robot body.

With soft elements (joints or links) in the leg mechanism, the resulting foot path will differ from the case when all the joints are ideal revolute joints and all links are rigid. Therefore, theoretical models can be used to predict the motion of a mechanism with soft elements. Specifically, the elastic deformation during movements can be modeled because a soft link deforms and a soft joint bends to allow rotational motion instead of rotating about a fixed axis. The modeling, however, is not trivial as it is a kinetostatic problem, i.e., the deformation will depend on the forces/moments experienced by each soft element. Moreover, the forces/moments will vary at different drive angles and under different loading conditions from the foot. The problem is further complicated by the various deformations for the soft element such as elongation, bending, and shear. Kinetostatic analysis is normally used to address such a complicated modeling problem. It derives the kinematic constraint equations based on PRB models using the vector loop equations for the entire mechanisms and static equilibrium equations using energy approaches. Then these two sets of equations can be solved simultaneously as they are coupled. However, such coupled kinetostatic models are computationally intensive, making them unsuitable for predicting the trajectories of mechanism with soft elements, especially when there are multiple soft elements in the mechanism.

Figure 5:
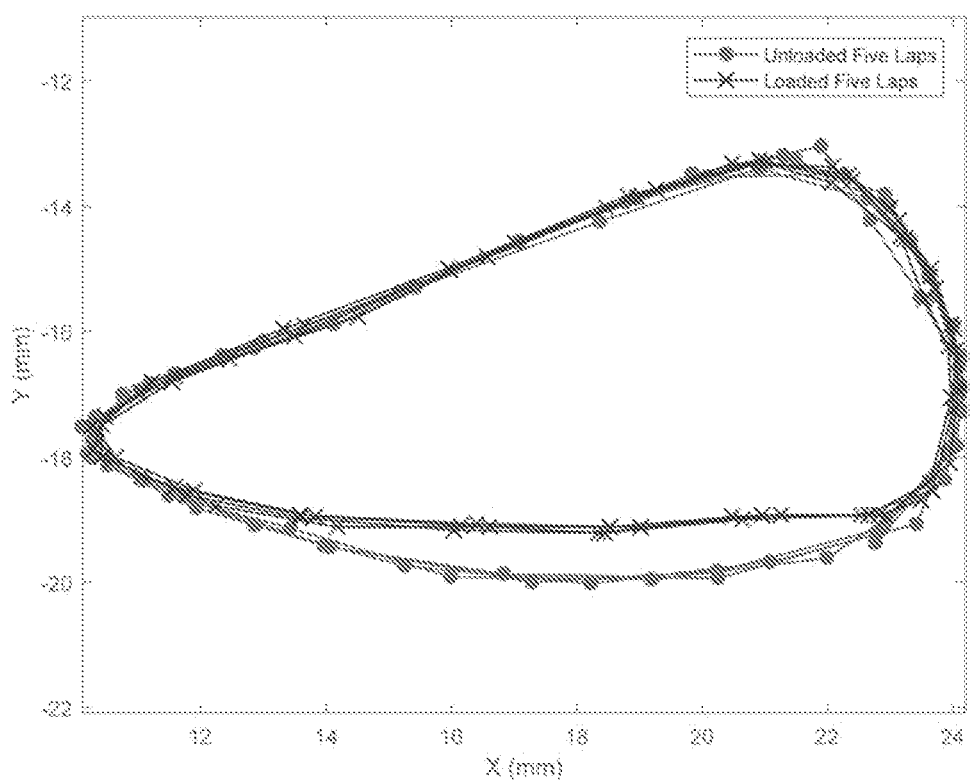
FIG. 5 five consecutive laps of experimental data for an exemplary robot according to principles described herein.

To address this issue, a numerical method is disclosed to predict the trajectory of mechanisms with soft elements. An assumption in the modeling and experiments is that no external load is applied to the mechanism other than the torque from the drive joint. Such an assumption is reasonable as supported by experimental data for the foot trajectories with and without load for the leg with only soft joints. The experiment is conducted by putting the robot without the battery and electronics into a mount to allow control of the robot's vertical height above a scale to simulate the robot's weight with a battery and electronics. The robot is then set on top of the scale and pressed down on the scale until the exact weight for the walking robot is achieved. The robot's legs are then driven and the foot trajectory is collected. The scale is then removed, and the robot is driven to obtain the foot trajectory for this unloaded case. Trajectory may be obtained according to principles described herein. Results of five laps for each case are shown in FIG. 5. From the comparison, it can be seen that the only difference for the trajectory is at the bottom part. It is almost flat in the loaded case since the leg contacts the ground, while it curves out a bit in the unloaded case since there is no ground to constrain the motion. Note that the trajectories for leg with both soft joints and links are expected to have a similar difference since the leg's dimensions remain the same. Since the bottom part in the trajectory will have a small impact on the walking capability, it is thus reasonable to develop a model without considering external loads. The models can be adapted to incorporate external loads.

The general procedure for the numerical method described herein is divided into two steps. Since the same procedure can be applied to both soft joints and links with different parameters, soft elements are used to indicate a joint or a link in the following discussion.

First, given a drive angle, the force/moment experienced by each soft element is solved by combining a traditional vector loop analysis and large deflection beam equations. Second, with the calculated forces and moments, a three-spring RPR model is used to solve for tip position and angle for each soft element, which can be then combined to solve for the foot's position. The modeling process used in previous research is also summarized to compare with the RPR model.

Figure 6:
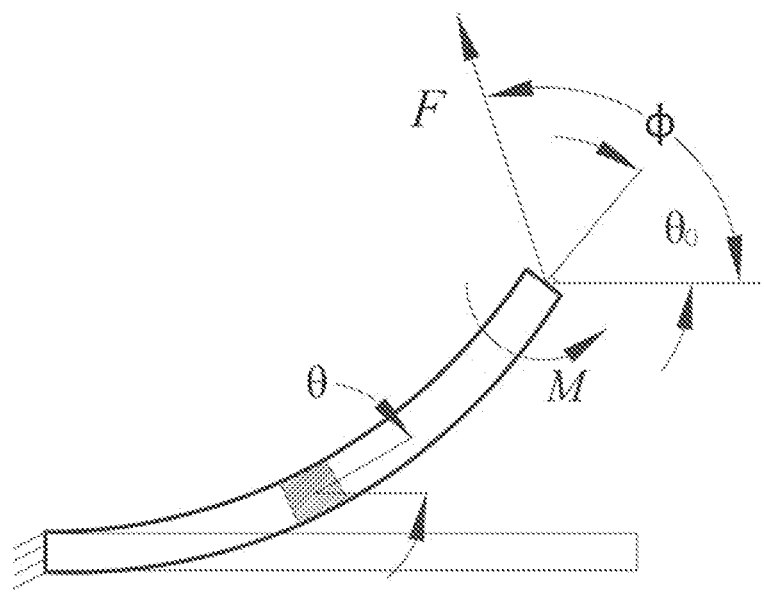
FIG. 6 illustrates a large deflection beam model showing variables and setup for use according to principles described herein.

As shown in FIG. 6, as the drive link rotates, the tip of any soft element in the leg mechanism will be subject to a force F and moment M, which will determine the element's deformation. Our goal in this subsection is to solve F and M to be used as input to the RPR or PRB 1R model.

Suppose F is applied at an angle of $\phi$, and the soft element deflects at an angle of $\theta_0$, then the deformation can be modeled using the equations for a large deflection beam $$\sqrt{\alpha} = \frac{1}{2}\int_0^{\theta_0} \frac{d\theta}{\sqrt{\cos(\theta_0 - \phi) - \cos(\theta - \phi) + \kappa}} \quad (1)$$

$$\kappa = \frac{b^2}{4a} \text{ with } a = \frac{Fl^2}{2EI}, b = \frac{Ml}{EI} \quad (2)$$

where E is the Young's modulus of the material, I is the area moment of inertia, and l is the length of the element. In general, it is impossible to solve F and M because there are more unknowns ($\phi$, $\theta_0$, F, and M) than equations (only one). To simplify the problem, consider an ideal mechanism when all the joints are ideal revolute ones and all links are rigid ones. In this case, given a drive link angle, traditional vector loop equations can be used for planar mechanisms to solve the force angle $\phi$ and the deflection angle $\theta_0$ for each joint/link. At the same drive link angle, if the drive joint torque is given, solve F and M applied at each joint/link can be solved using the static analysis for planar mechanisms.

According to principles described herein, the numerical procedure to find F and M for each soft element is based on such observations. Given a drive link angle, the drive torque is iteratively found to first solve $\phi$ and $\theta_0$, F, and M, and then substitute them into the large deflection beam equation to ensure the equation will hold. Then the resulting F and M will be considered as the solution. Note that using the ideal mechanism to solve for F and M is reasonable since the mechanism with soft elements should resemble a trajectory similar to the ideal mechanism, although some errors exist. All soft joints in the leg mechanism are geometrically identical. Two of them (Joint 4 and Joint 5) are attached to ground and are solved with no modification to the large deflection equations. However, the other three joints (Joint 3, Joint 6, and Joint 7) are located between two moving links and therefore have to be dealt with specially. The force angle $\phi$ and the desired joint angle $\theta_0$, rather than just being functions of the link the joint is attached to, are functions of the difference between the two links they sit between. Doing this fixes the base of the joint in space while only applying forces and deflections to the free end. Once all forces/moments are solved for, either a three-spring RPR model or PRB 1R model can be used to predict the soft element's tip position and angle.

With the force/moment applied to each soft element, its deformation can be solved with analytical models based on elasticity theory. However, it is computationally intensive to solve such analytical models. Therefore, researchers have investigated various approximation methods, e.g., the widely used PRB 1R model for rigid compliant joints.

A three-spring RPR model is recently developed for elastomer elements, which satisfies four important criteria to make it ideal for the mechanism being studied in this paper. First, it can predict the element's end position and orientation for large deflections. Second, it takes into account axial deformation of the element. Third, it is simple enough to be used in kinematics analysis of the mechanism. Fourth, all of the model parameters are load independent, meaning the model can generate accurate predictions with the same parameters under different applied forces/moments.

Figure 7:
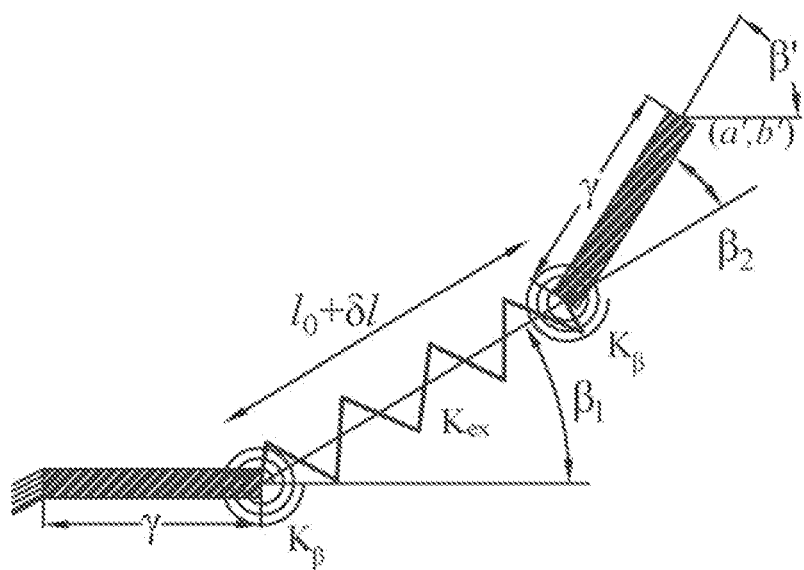
FIG. 7 illustrates a three spring RPR joint model showing joint parameters and variables for use according to principles described herein.

The three-spring RPR model is a serial chain of three joints to approximate the deformation of a soft element: a revolute joint with a torsional spring at its center attached to the base of the element, a prismatic joint modeled as a linear spring from the first joint to the third joint, and a second revolute joint with a torsional spring attached to the free end of the element. FIG. 7 shows the schematic of the joint model with variables labeled. Assume the length of the undeformed soft element is L, the length of the rigid section at each end of the joint is $\gamma L$ with $\gamma$ a ratio. $K_\beta$ is the torsional spring constant of the spring at each revolute joint, and $K_{ex}$ is the spring constant of the linear spring. The linear spring is modeled such that it cannot bend, as if a prismatic joint is present. The initial length of the spring is $l_0$ with an elongation of $\delta l$ after deformation. The linear spring accounts for the axial deformation of the soft element, while the torsional springs account for the bending. The parameters needed for this RPR model are $\gamma$, $K_\beta$, and $K_{ex}$, which are dimensionless constants related to $K_\beta$, $K_{ex}$, and $l_0$ through:

$$K_\beta = k_\beta \frac{EI}{L}, K_{ex} = k_{ex} \frac{EA}{L}, l_0 = L(1 - 2\gamma) \quad (3)$$

where E and I are the same as in Eq. (2) and A is the cross-sectional area. The optimal and load-independent parameters γ, Kβ, and Kex have been obtained through minimizing the error for tip position and angle of a soft element between the RPR model and the Timoshenko beam model, which can serve as the ground truth since it considers the axial deformation and shear for soft elements. The accuracy of using the three-spring RPR model is evaluated to be able to achieve as high as 98% using a compliant finger with two soft joints compared against the finite element analysis results.

The optimal γ, Kβ, and Kex are found to depend on the length-to-height ratios for soft elements through $$\gamma = -0.0281 \frac{L^2}{h^2} + 0.2266 \frac{L}{h} - 0.2698 \quad (4)$$

$$k_\beta = -0.0017 \frac{L}{h} + 2.0220$$

$$k_{ex} = -0.0942 \frac{L}{h} + 1.3002$$

According to this equation, the three parameters can be found for both soft joints and links. With L=1.5 mm and h=1.0 mm for soft joints, the parameters can be calculated as γ=0.00687, $K_\beta$=2.019, and $K_{ex}$=1.159. With L=2.56 mm and h=1.0 mm for link $D_3$, the parameters are γ=0.126, $K_\beta$=2.018, and $K_{ex}$=1.059. With L=3.8 mm and h=1.0 mm for link $D_4$, the parameters are γ=0.185, $K_\beta$=2.016, and $K_{ex}$=0.942.

With γ, $K_\beta$, and $K_{ex}$, when a load $\mathcal{F}$ =[F cos φ; F sin φ, M]$^T$ is applied to the free end of the soft element, the tip position and angle can be solved through the following steps: Solve the reaction force/torque at each joint in the RPR chain using:

$$\tau = J^T \mathcal{F} \quad (5)$$

where $\tau$=[$K_\beta \beta_1$; $K_\beta \beta_2$; $K_{ex} \delta l$]$^T$ are the joint forces and torques, and J is the Jacobian of the RPR chain given by $$J = \begin{bmatrix} \gamma L[\sin(\beta_2 - \beta_1)] - & & \gamma L[\cos\beta_1 \sin\beta_1 - \\ (l_0 + \delta l)\cos\beta_1 & , -\sin\beta_1, & \cos\beta_2 \sin\beta_1] \\ \gamma L[\cos(\beta_1 - \beta_2)] - & & \\ (l_0 + \delta l)\sin\beta_1 & , \cos\beta_1, & \gamma L[\cos(\beta_1 - \beta_2)] \\ 1 & 0 & 1 \end{bmatrix} \quad (6)$$

Equation (5) has three equations with three unknowns: $\beta_1$, $\beta_2$ and $\delta l$. The three equations can be solved simultaneously to get these unknowns. The tip location (a' and b') and angle ($\beta_1$) of the soft element can then be solved using the forward kinematic equations of the RPR link $$a' = \gamma L + (l_0 + \delta l)\cos \beta_1 + \gamma L \cos(\beta_1 + \beta_2) \quad (7)$$

$$b' = (l_0 + \delta l)\sin \beta_1 + \gamma L \sin(\beta_1 + \beta_2) \quad (8)$$

$$\beta' = \beta_1 + \beta_2 \quad (9)$$

Figure 8:
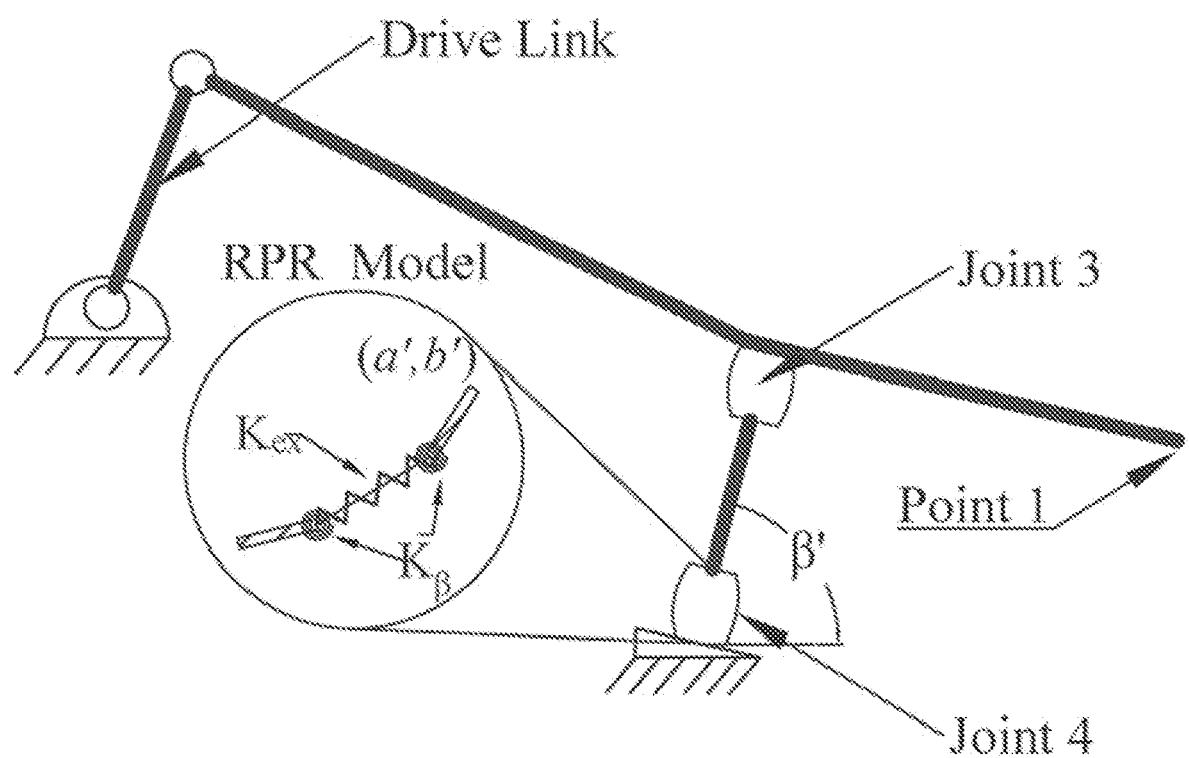
FIG. 8 illustrates a three spring RPR model to replace a single soft joint in a leg mechanism for use according to principles described herein

Once the position and angle of each soft element are obtained, they are used to solve for the foot's position in the leg mechanism as indicated in FIG. 3. FIG. 8 illustrates how the three-spring RPR model is incorporated into the leg mechanism with only the four bar mechanism and how the joint variables β'; a', and b' drive the mechanism motion. With the position and angle of each soft element, a vector loop process is used solve for the foot's position.

With the derived forces/moments, the classic PRB 1R model is used to solve the tip position and angle of a soft element. The 1R model simplifies the analysis for large deflections of compliant elements by approximating the element with two rigid links connected by a revolute joint with a torsional spring. Nevertheless, this method and the more advanced 3R model assume a fixed location for each of the joints. While this method works well for long and slender compliant beams, when the length to width ratio gets smaller, the accuracy decreases as the rotation center of the joint is more likely to change with different load ratios κ defined in Eq. (2). The large deflection equations (Eqs. (1) and (2)) are used together with the 1R model with an instantaneous center (IC) of rotation to solve the foot position of the leg mechanism. The 1R model will lead to large errors in path prediction because it does not consider the axial deformation of soft elements. For a given drive angle, the load ratio κ for each soft element can be calculated with the force F and moment M as provided above. With the load ratio, the IC for a soft element can be determined by the characteristic radius factor α. A soft element with an α=0.5 means that the rotation center is in the middle of the element. The 1R model results in a range of αs from 0.9 to 0.75. It has been shown that α can be calculated from the load ratio κ through $$\alpha \approx \frac{\alpha_F + 2\alpha_M c_\alpha \kappa}{1 + 2c_\alpha \kappa} \quad (10)$$

where $\alpha_F$=0.842 is the radius factor when pure force is applied at the tip (i.e., M=0), $\alpha_M$=0.735 is the radius factor when pure moment is applied (i.e., F=0), and $c_\alpha$=4.694 is an index obtained with linear regression using the relationship for κ and α derived from the Euler-Bernoulli beam model. It is shown that Eq. (10) can achieve an accuracy of 98% for estimating the α. This accuracy means that the deformation can be estimated for an element that can be approximated with the Euler-Bernoulli beam model, where the axial deformation is not considered. Therefore, even with an accuracy of 98% for the PRB 1R model with ICs, the model may not be accurate enough since axial deformation is not negligible for soft elements.

Using the 1R model with ICs, the position of the foot for the leg mechanism given a drive angle can be solved.

Figure 9:
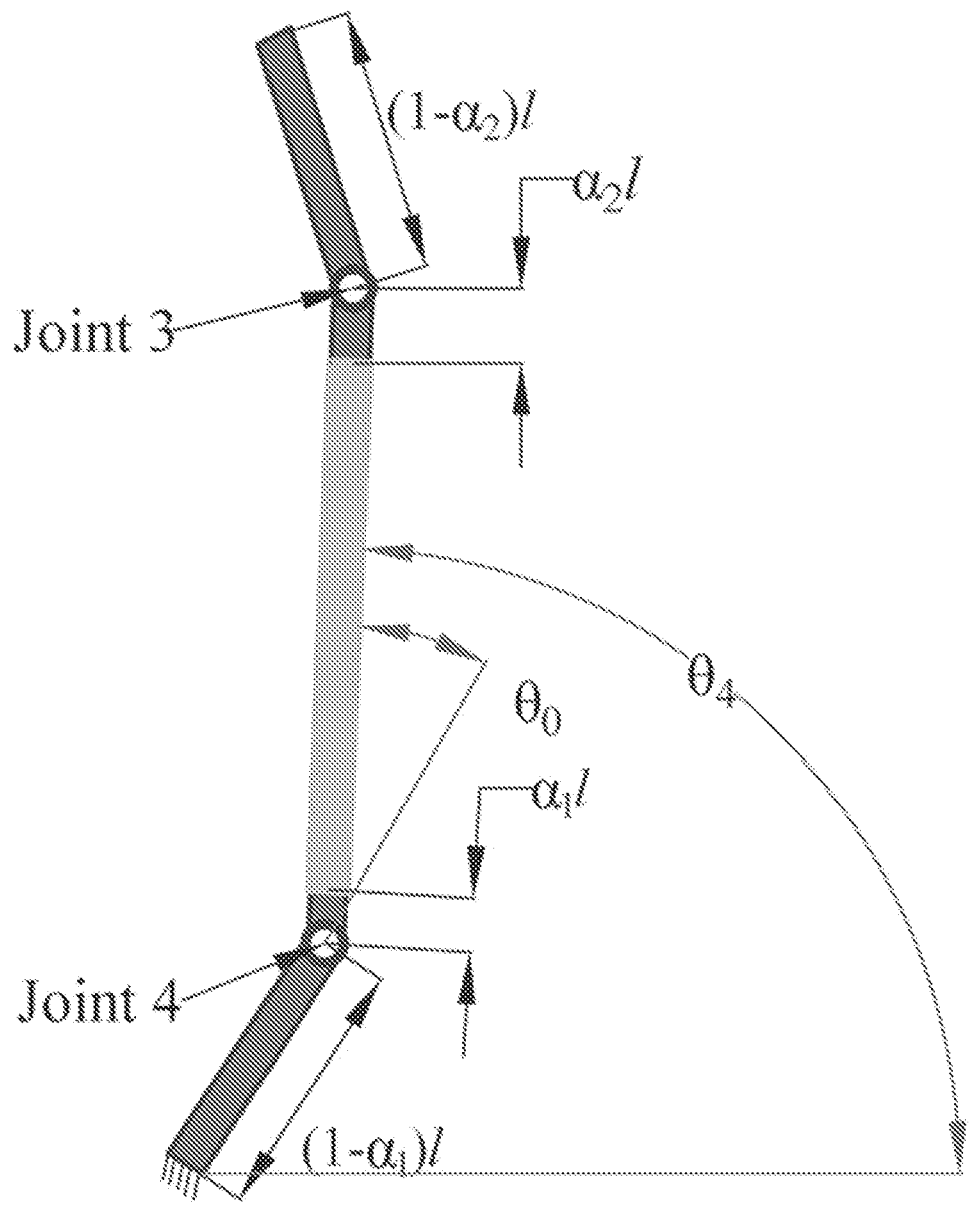
FIG. 9 illustrates an example use of an IR model to calculation position of a foot for a given drive angle

As shown in FIG. 9, a link 3 is used with two soft joints of the leg mechanism (see FIG. 3 for location). For a given drive link angle, the angle $\theta_4$ can be obtained using the characteristic radius factor $\alpha_1$ and $\alpha_2$ for Joint 3 and Joint 4, respectively. This is then used to find the path of point 1 on the mechanism. Then this process is repeated to find the next set of angles associated with $D_4$, $D_5$, and $D_6$ and finally the location of the foot. More detailed derivation of position analysis using the 1R model with ICs can be found in Ref [31], which is hereby incorporated by reference for all purposes as if fully set forth herein. Note a similar procedure can be used to derive the foot's location if links 3 and 4 are soft.

EXPERIMENTAL RESULTS

Two sets of experiments have been conducted. The first one is to verify the modeling results for leg's trajectories with an error analysis for the RPR and 1R models. In this case, experiments for both a leg with only soft joints and a leg with soft joints and links were conducted. After testing a leg's trajectories, the second set of experiments demonstrate the robot's locomotion capabilities with legs made from both soft joints and links.

To experimentally obtain the trajectory for the leg, video analysis by recording a video of the leg motion was performed, and then the trajectory manually obtained off-line by analyzing each frame from the video.

To make video analysis more accurate and faster, a single leg was printed on a test stand identical to one of the four legs in the robot. At the end of this leg, some black soft materials are designed and printed on top of the rigid white material to facilitate the track process after the video is obtained. The experimental setup consists of a Logitech C615 web-camera, a tripod with level bubble, robot mount, a laptop, and an external power supply. The test stand is positioned on the table and set level to the table edge for a horizontal reference. Then the camera is set level on the tripod about 50 mm away from the test stand, and a video is recorded by the laptop.

Once the video is collected, a video analysis software TRACKER 2 is used to go frame by frame, track the black part on the foot, and plot its path. With such a setup, the measurement accuracy of the camera is around 0.2 mm, which is the true length each pixel in the image can have. For the leg with only soft joints, the experimental results together with modeling results are shown in FIG. 10, while for the leg with both soft joins and links, the results are shown in FIG. 11.

Figure 12:
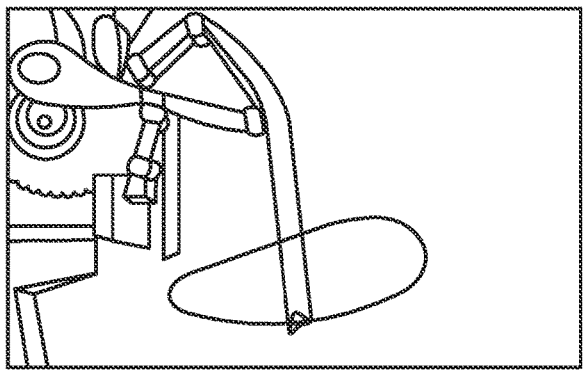
FIG. 12 shows a leg with only soft joints.
Figure 12:
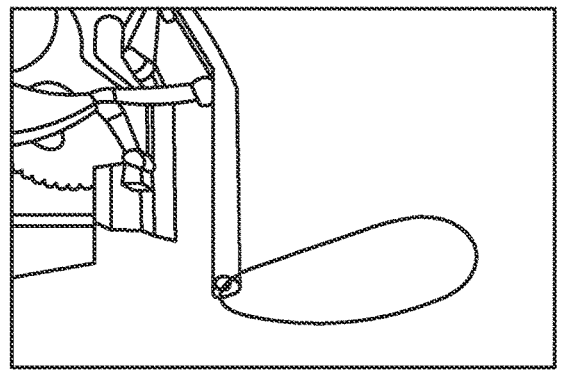
Figure 12:
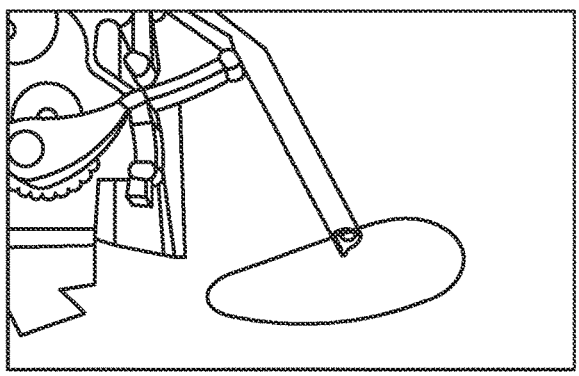
Figure 12:
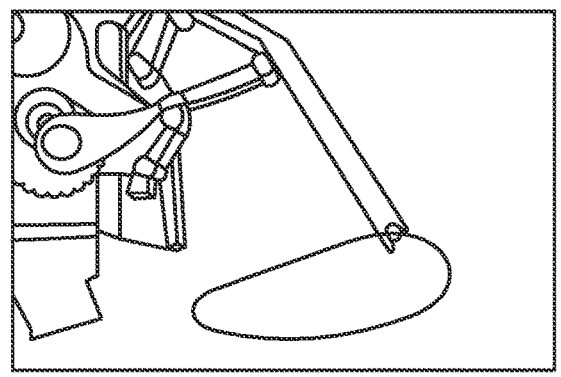
Figure 12:
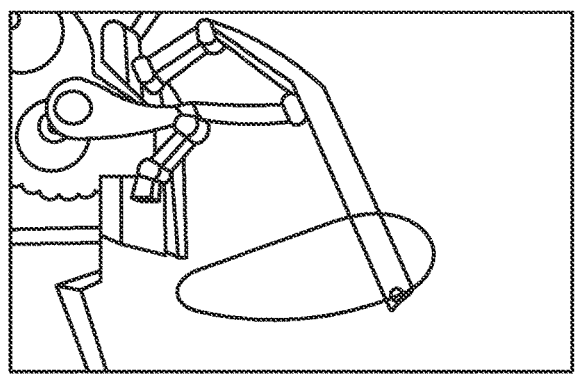
Figure 13:
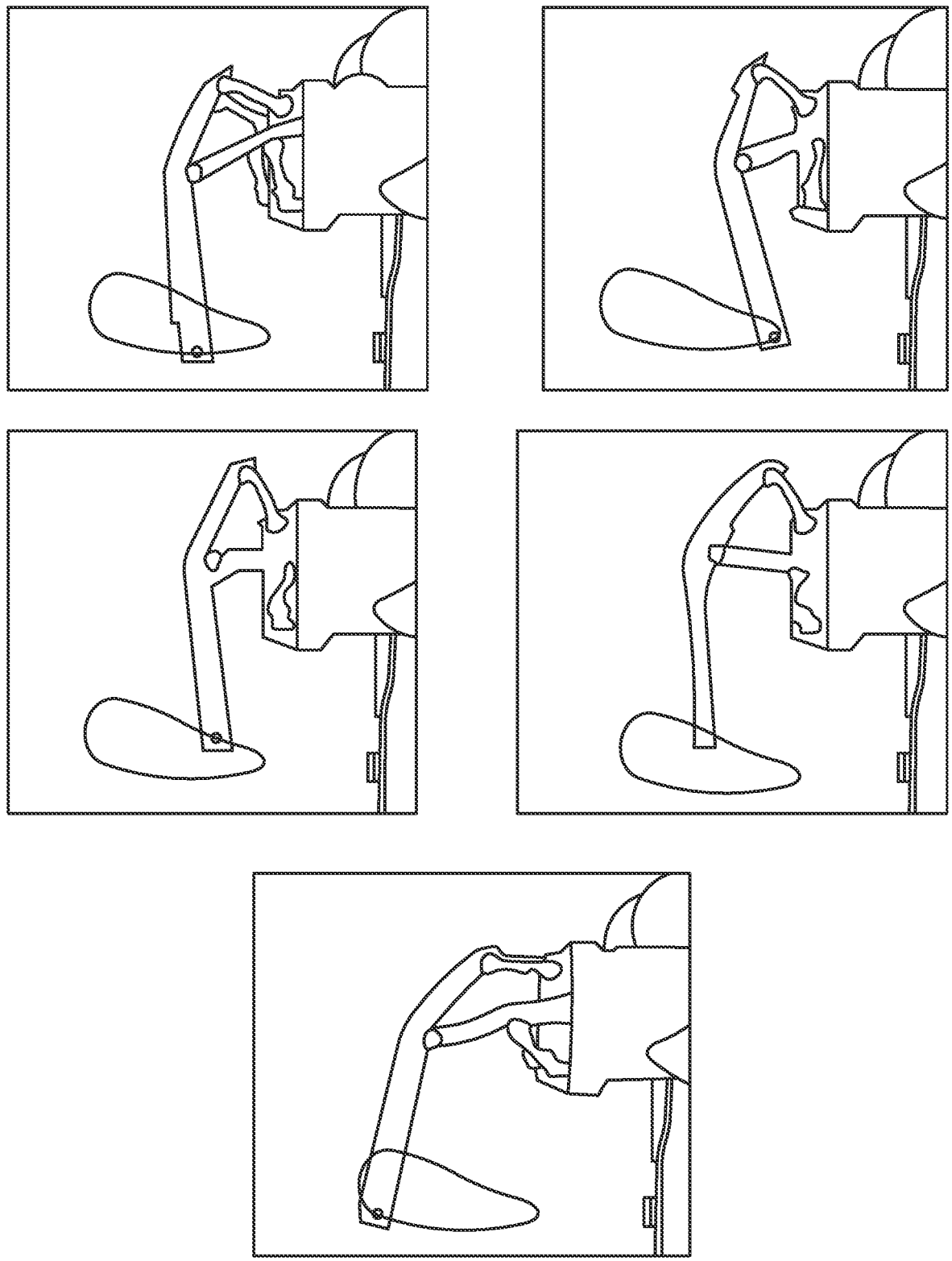
FIG. 13 shows a leg with soft joints and links.

Both figures show three trajectories: RPR model path, PRB 1R model path, and experimental path. The RPR model path is generated using the model described herein, which considers both rotation and axial deformation for each soft element. The PRB 1R model path is generated using the modeling approach presented herein. This model uses PRB 1R with ICs and only accounts for rotation. The experimental path is obtained from the video analysis of the physical mechanism. Sequential images of the single leg motion used to get the experimental path with the path over the top are in FIGS. 12 and 13 for each case. FIGS. 10 and 11 also label four key drive link angles on each path to indicate these positions occur at the same time for all three trajectories. Note that only one cycle of motion of for experiments is plotted in FIGS. 10 and 11 for a clear representation of data, but the motion is quite repeatable based on five cycles of motion.

Figure 10:
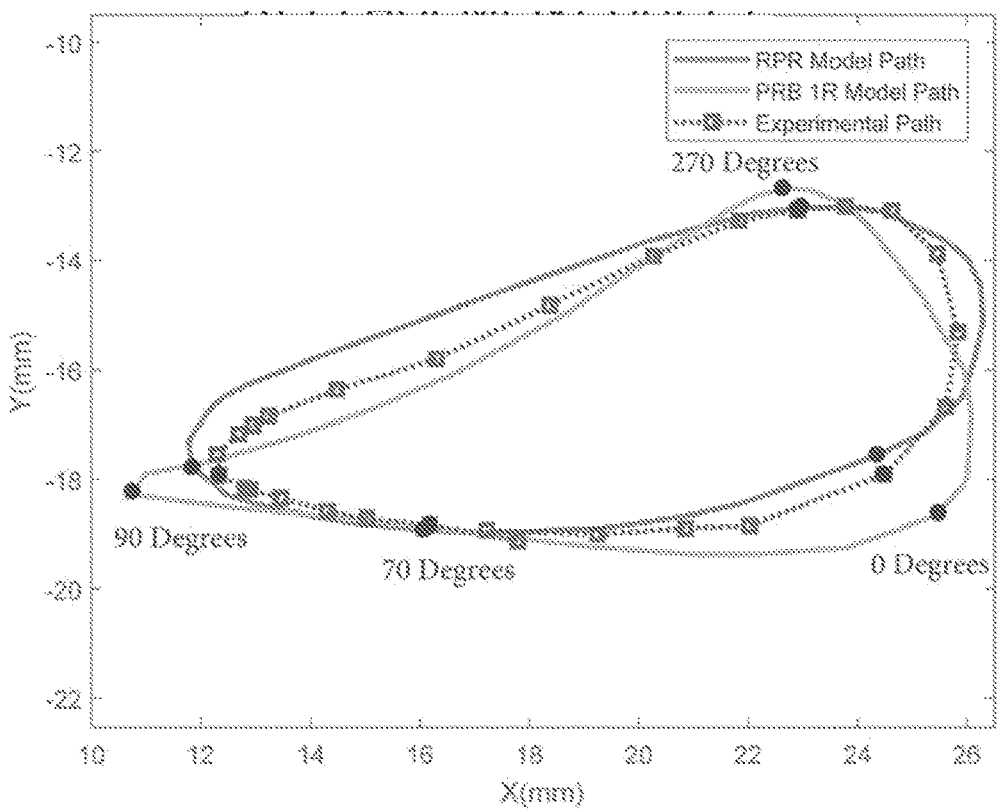
FIG. 10 illustrates foot trajectories for a leg with soft joints according to principles described herein.
Figure 11:
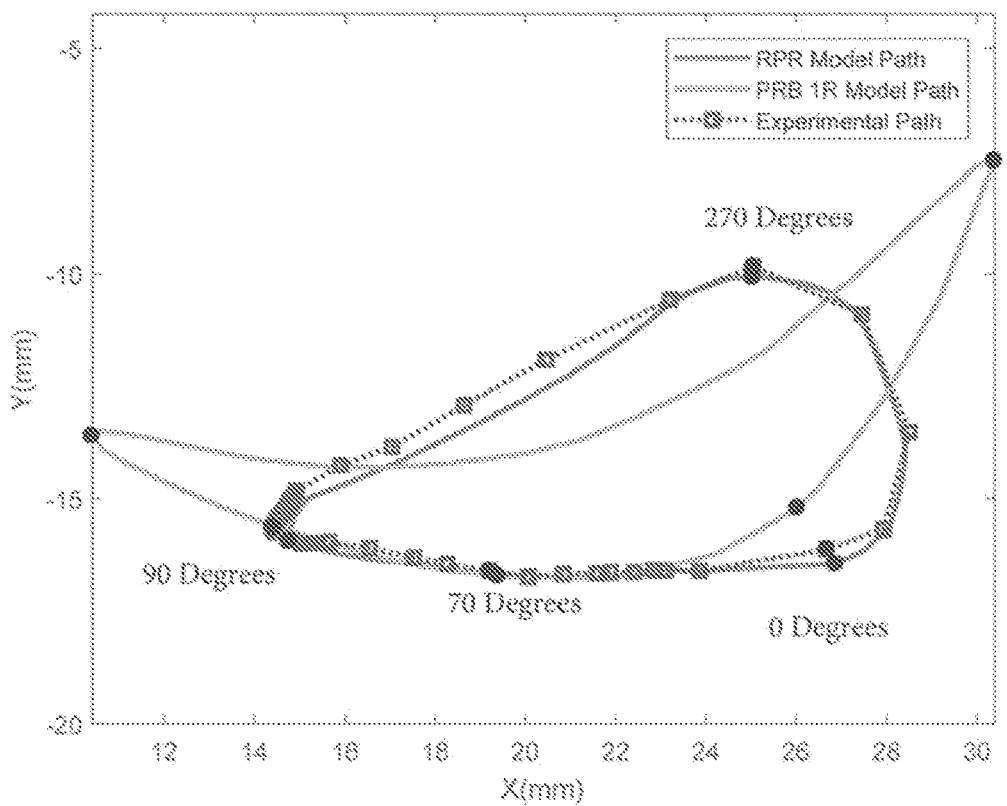
FIG. 11 illustrates foot trajectories for a leg with soft joints and links according to principles described herein.

Both FIGS. 10 and 11 show that the RPR model can predict the motion of foot more accurately than the 1R model. Because the 1R model does not consider axial deformation of the soft elements, it cannot capture the true position of the mechanism at the extreme location within the path when either a single or multiple soft joints are at their max deformation angle. Since the RPR model does account for axial deformation, it can significantly improve the prediction accuracy for not only the extreme points but also the entire path. The error for using 1R model is even larger for the leg with soft joints and links. This is because in addition to simple bending motion for soft joints, soft link D4 will have both positive and negative curvatures when the drive angle is close to 90 deg or 270 deg (FIG. 11), for which the RPR model can capture but the 1R model cannot.

In order to quantify and compare the accuracy of the RPR model and 1R model, the error for a single point in the trajectory can be defined as follows:

$$\text{error} = \sqrt{(X_{exp} - X_{model})^2 + (Y_{exp} - Y_{model})^2} \quad (11)$$

For a foot position $[X_{exp}, Y_{exp}]$ in an image from the recorded video, the drive link angle in the image is obtained. This drive link angle is used for both the RPR and 1R models to obtain the $[X_{model}, Y_{model}]$. The error is calculated at each experimental data point $[X_{exp}, Y_{exp}]$ along the path. The average and maximum errors are listed in Tables 1 and 2 for the two leg mechanisms. In these two tables, errors if a traditional ideal revolute joint model were used are listed, i.e., when all the joints are ideal revolute ones and all links are rigid ones. These results show that the RPR model is more accurate in terms of both average and maximum errors than the previously used PRB 1R model, owing to the non-negligible axial deformations.

TABLE 1

Path error for leg with only soft joints (FIG. 10)

| Foot path error | Average (mm) | Max (mm) |
| --- | --- | --- |
| RPR model | 0.35 | 0.54 |
| 1R model | 0.43 | 1.61 |
| Revolute model | 0.90 | 5.50 |

TABLE 2

Path error for leg with soft joints and links (FIG. 11)

| Foot path error | Average (mm) | Max (mm) |
| --- | --- | --- |
| RPR model | 0.26 | 0.58 |
| 1R model | 1.79 | 6.20 |
| Revolute model | 1.66 | 8.12 |

Average error: For leg with only soft joints, the RPR model's average error is 81% and 39% of the error from the 1R model and revolute joint model, respectively. For leg with soft joints and links, the RPR model's error is even smaller with only 15% and 16% of the other two models. In this case, it is also interesting to see that the average error for 1R model (1.79 mm) is even larger than the ideal revolute model (1.66 mm). Maximum error: For leg with only soft joints, the maximum error for both RPR and 1R model occurs at the far left side of FIG. 10, which represents an extreme in the path where the joint deformation is greatest. But for leg with soft joints and links, the maximum error occurs at different locations. For leg with only soft joints, the RPR model's maximum error is 34% and 10% of the error from the 1R model and revolute joint model, respectively. For leg with soft joints and links, the RPR model's maximum error is much smaller with only 9% and 7% of the other two models.

Using RPR model improves over previous results presented in Ref. [31]; however, some error may still exist. There are three possible sources for the error. First, the RPR model is only an approximation to the deformation of soft elements to facilitate the mechanisms analysis procedure to obtain a relatively accurate estimation in a timely fashion. In order to obtain more accurate predictions, more sophisticated models should be utilized (e.g., the Timoshenko beam model). Second, the force and moment required for the RPR model might not be accurate enough. They are obtained by assuming the mechanism has ideal revolute. An iterative procedure to use the derived deflection angle in the RPR model to solve the force and moment again might increase the precision, but at the cost of more computations.

Third, the measurement procedure may not be not accurate enough with a webcam and a manual setup. Having a higher resolution camera with a faster frame rate would allow for more data points and more accurate video tracking.

4.3 Walking Capabilities. A robot having a design according to principles described herein was fabricated and assembled to demonstrate its walking capabilities. The exemplary robot has overall dimensions of 49×38×25 mm and weighs 14.5 g including a Lithium Ion battery (PRT-13853, Sparkfun) and a wireless controller (Rx43d-2-v5, DelTang). Also, a robot with legs having both soft joints and links was tested, which proved to be very durable. With the legs running for several hundreds of cycles, no delamination in any joint or link is found.

Figure 14:
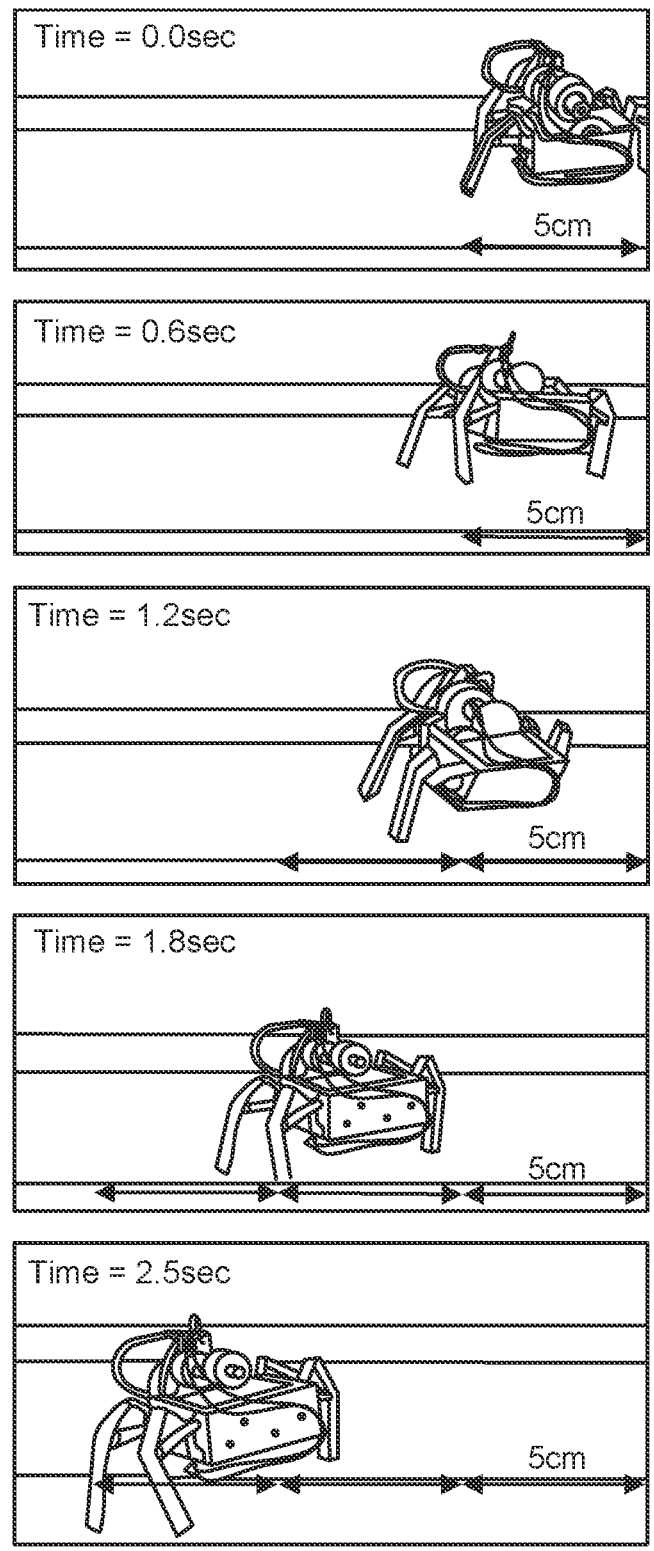
FIG. 14 is sequential images of a robot locomotion according to principles described herein.

After assembling the robot with all the required parts for remote control, including the battery and the wireless controller, which had an onboard motor driver to control the robot to move either forward or backward, with the functional robot, it walked on a flat surface and the walking captured on video. The results of these tests show the robot can consistently move at 5.7 cm/s or >1 body length/second in a stable manner in both directions of motion. Still frames of the test at different time are shown in FIG. 14. The weight of the motor, battery, and wireless controller together accounts for half the robot's total weight. As a result, careful positioning of these components is needed to ensure that the robot is properly balanced. Since the motor's position was fixed after the design, the battery and wireless controller could be placed at different locations on the robot to achieve the smoothest locomotion of the robot. FIG. 14 shows the robot wandering off toward the camera, indicating the robot is not ideally balanced. The use of a smaller battery (e.g., the ultralow weight lithium ion batteries (<1 g) from Power-Stream) and motor would reduce their percentage of the weight and allow for better balancing.

Thus, the design, modeling, and experimentation of a centimeter-scale walking robot are presented. Different from existing miniature walking robots, the presented robot can be directly fabricated using the multimaterial 3D printing (MM3P) technology with soft material for joints or links and rigid material for other parts. A modified Klann mechanism is adopted for each of the four legs, and with MM3P, all the legs can be fabricated with the body. As soft elements are different from traditional compliant elements, a numerical method is developed to analyze the motion trajectories for mechanisms with such soft elements focusing on capturing both the rotational and axial deformation. Experimental results on a single leg's motion verify the effectiveness of the proposed numerical method and its improved accuracy over previous numerical models of the same mechanism, while walking experiments demonstrate the robot's locomotion capabilities.

Moving forward, utilizing a smaller motor and battery along with a thorough analysis of the robot's gait pattern through a torque analysis of the motor and position analysis of all four legs could lead to reduced weight, more stable, and faster locomotion is possible. The numerical model can be used to optimize joint design, which can reduce the modeling error and decrease the required torque from the motor. Finally, mechanisms with both soft joints and links according to principles described herein can be applied in mechanisms for a wide variety of applications including robotics, deployable structures, or metamaterials.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Throughout this application, various publications may have been referenced. The disclosures of these publications in their entireties are hereby incorporated by reference into this application in order to more fully describe the state of the art to which this invention pertains. These references include:

[1] Zhao, J., Xu, J., Gao, B., Xi, N., Cintron, F., Mutka, M., and Xiao, L., 2013, "MSU Jumper: A Single-Motor-Actuated Miniature Steerable Jumping Robot," IEEE Trans. Rob., 29(3), pp. 602-614.

[2] Hoover, A. M., Steltz, E., and Fearing, R. S., 2008, "RoACH: An Autonomous 2.4 g Crawling Hexapod Robot," IEEE/RSJ International Conference on Intelligent Robots and Systems (IROS), Nice, France, September 22-26, pp. 26-33.

[3] Kohut, N. J., Hoover, A. M., Ma, K. Y., Baek, S. S., and Fearing, R. S., 2011, "MEDIC: A Legged Millirobot Utilizing Novel Obstacle Traversal," IEEE International Conference on Robotics and Automation (ICRA), Shanghai, China, May 9-13, pp. 802-808.

[4] Birkmeyer, P., Peterson, K., and Fearing, R. S., 2009, "DASH: A Dynamic 16 g Hexapedal Robot," IEEE/RSJ International Conference on Intelligent Robots and Systems (IROS), St. Louis, Mo., October 10-15, pp. 2683-2689.

[5] Baisch, A. T., Ozcan, O., Goldberg, B., Ithier, D., and Wood, R. J., 2014, "High Speed Locomotion for a Quadrupedal Microrobot," Int. J. Rob. Res., 33(8), pp. 1063-1082.

[6] Pierre, R. S., and Bergbreiter, S., 2017, "Gait Exploration of Sub-2 g Robots Using Magnetic Actuation," IEEE Rob. Autom. Lett., 2(1), pp. 34-40.

[7] Wood, R., Avadhanula, S., Sahai, R., Steltz, E., and Fearing, R., 2008, "Microrobot Design Using Fiber Reinforced Composites," ASME J. Mech. Des., 130(5), p. 052304.

[8] Cutkosky, M. R., and Kim, S., 2009, "Design and Fabrication of Multi-Material Structures for Bioinspired Robots," Philos. Trans. R. Soc. London A, 367(1894), pp. 1799-1813.

[9] Dollar, A. M., and Howe, R. D., 2006, "A Robust Compliant Grasper Via Shape Deposition Manufacturing," IEEE/ASME Trans. Mechatronics, 11(2), pp. 154-161.

[10] Kim, S., Clark, J. E., and Cutkosky, M. R., 2006, "iSprawl: Design and Tuning for High-Speed Autonomous Open-Loop Running," Int. J. Rob. Res., 25(9), pp. 903-912.

[11] Bejgerowski, W., Gerdes, J. W., Gupta, S. K., and Bruck, H. A., 2011, "Design and Fabrication of Miniature Compliant Hinges for Multi-Material Compliant Mechanisms," Int. J. Adv. Manuf. Technol., 57(5-8), p. 437.

[12] Bejgerowski, W., Gerdes, J. W., Gupta, S. K., Bruck, H. A., and Wilkerson, S., 2010, "Design and Fabrication of a Multi-Material Compliant Flapping Wing Drive Mechanism for Miniature Air Vehicles," ASME Paper No. DETC2010-28519.

[13] Vogtmann, D. E., Gupta, S. K., and Bergbreiter, S., 2011, "Multi-Material Compliant Mechanisms for Mobile Millirobots," IEEE International Conference on Robotics and Automation (ICRA), Shanghai, China, May 9-13, pp. 3169-3174.

[14] Vogtmann, D. E., Gupta, S. K., and Bergbreiter, S., 2013, "Characterization and Modeling of Elastomeric Joints in Miniature Compliant Mechanisms," ASME J. Mech. Rob., 5(4), p. 041017.

[15] Gaynor, A. T., Meisel, N. A., Williams, C. B., and Guest, J. K., 2014, "Multiple-Material Topology Optimization of Compliant Mechanisms Created Via Polyjet Three-Dimensional Printing," ASME J. Manuf. Sci. Eng., 136(6), p. 061015.

[16] Bruyas, A., Geiskopf, F., and Renaud, P., 2015, "Design and Modeling of a Large Amplitude Compliant Revolute Joint: The Helical Shape Compliant Joint," ASME J. Mech. Des., 137(8), p. 085003.

[17] Bruyas, A., Geiskopf, F., and Renaud, P., 2015, "Toward Unibody Robotic Structures With Integrated Functions Using Multimaterial Additive Manufacturing: Case Study of an MRI-Compatible Interventional Device," IEEE/RSJ International Conference on Intelligent Robots and Systems (IROS), Hamburg, Germany, September 28-October 2, pp. 1744-1750.

[18] Bartlett, N. W., Tolley, M. T., Overvelde, J. T., Weaver, J. C., Mosadegh, B., Bertoldi, K., Whitesides, G. M., and Wood, R. J., 2015, "A 3D-Printed, Functionally Graded Soft Robot Powered by Combustion," Science, 349 (6244), pp. 161-165.

[19] Kalisky, T., Wang, Y., Shih, B., Drotman, D., Jadhav, S., Aronoff-Spencer, E., and Tolley, M. T., 2017, "Differential Pressure Control of 3D Printed Soft Fluidic Actuators," IEEE/RSJ International Conference on Intelligent Robots and Systems (IROS), Vancouver, BC, Canada, September 24-28, pp. 6207-6213.

[20] Behbahani, S. B., and Tan, X., 2016, "Design and Modeling of Flexible Passive Rowing Joint for Robotic Fish Pectoral Fins," IEEE Trans. Rob., 32(5), pp. 1119-1132.

[21] Chen, T., Mueller, J., and Shea, K., 2017, "Integrated Design and Simulation of Tunable, Multi-State Structures Fabricated Monolithically With Multi-Material 3D Printing," Sci. Rep., 7, p. 45671.

[22] Overvelde, J. T., Weaver, J. C., Hoberman, C., and Bertoldi, K., 2017, "Rational Design of Reconfigurable Prismatic Architected Materials," Nature, 541(7637), pp. 347-352.

[23] Venkiteswaran, V. K., and Su, H.-J., 2016, "A Three-Spring Pseudorigid-Body Model for Soft Joints With Significant Elongation Effects," ASME J. Mech. Rob., 8(6), p. 061001.

[24] Ma, K. Y., Chirarattananon, P., Fuller, S. B., and Wood, R. J., 2013, "Controlled Flight of a Biologically Inspired, Insect-Scale Robot," Science, 340(6132), pp. 603-607.

[25] Dado, M. H., 2005, "Limit Position Synthesis and Analysis of Compliant 4-Bar Mechanisms With Specified Energy Levels Using Variable Parametric Pseudo-Rigid-Body Model," Mech. Mach. Theory, 40(8), pp. 977-992.

[26] She, Y., Su, H.-J., Meng, D., Song, S., and Wang, J., 2018, "Design and Modeling of a Compliant Link for Inherently Safe Corobots," ASME J. Mech. Rob., 10(1), p. 011001.

[27] Stilli, A., Wurdemann, H. A., and Althoefer, K., 2017, "A Novel Concept for Safe, Stiffness-Controllable Robot Links," Soft Rob., 4(1), pp. 16-22.

[28] Venkiteswaran, V. K., and Su, H.-J., 2016, "Extension Effects in Compliant Joints and Pseudo-Rigid-Body Models," ASME J. Mech. Des., 138(9), p. 092302.

[29] Tari, H., and Su, H.-J., 2011, "A Complex Solution Framework for the Kinetostatic Synthesis of a Compliant Four-Bar Mechanism," Mech. Mach. Theory, 46(8), pp. 1137-1152.

[30] Belfiore, N. P., and Simeone, P., 2013, "Inverse Kinetostatic Analysis of Compliant Four-Bar Linkages," Mech. Mach. Theory, 69, pp. 350-372.

[31] DeMario, A., and Zhao, J., 2017, "A Miniature, 3D-Printed, Walking Robot With Soft Joints," ASME Paper No. DETC2017-68182.

[32] Klann, J. C., 2002, "Walking Device," U.S. Pat. No. 6,478,314.

[33] Sheba, J. K., Elara, M. R., Mart_inez-Garc_ia, E., and Tan-Phuc, L., 2017, "Synthesizing Reconfigurable Foot Traces Using a Klann Mechanism," Robotica, 35(1), pp. 189-205.

[34] Morita, K., and Ishihara, H., 2006, "Proposal of 4-Leg Locomotion by Phase Change," Climbing and Walking Robots, Springer, Berlin, pp. 517-524.

[35] Su, H.-J., 2009, "A Psuedorigid-Body 3R Model for Determining Large Deflection of Cantilever Beams Subject to Tip Loads," ASME J. Mech. Rob., 1(2), p. 021008.

[36] Norton, R. L., 2011, Design of Machinery, 5th ed., McGraw-Hill, New York.

[37] O'Reilly, O. M., 2017, Modeling Nonlinear Problems in the Mechanics of Strings and Rods, Springer, Berlin.

[38] Howell, L. L., 2001, Compliant Mechanisms, Wiley, Hoboken, N.J.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A robot, comprising:
a body;
a drive train comprising a plurality of gears;
a gear motor coupled to the drive train for driving the gears;
four legs, wherein each leg comprises a plurality of links and a plurality of joints,
wherein one of the joints is operatively coupled to the drive train as an input joint and
wherein one link of the links of each leg is a drive link coupling a respective leg to the drive train via the input joint wherein at least two of the joints are ground joints, each ground joint operatively connected to one movable link from among the links, such that one end of the one movable link is fixed, wherein the legs and the body comprise a unitary structure including materials of two different tensile strengths.

2. The robot of claim 1, wherein the drive link comprises a soft material of a different tensile strength than the material forming the legs.

3. The robot of claim 1, wherein the legs comprise soft joints of a material having a different tensile strength than the material forming the legs.

4. The robot of claim 1, wherein the joints comprise at least one revolute joint.

5. The robot of claim 1, wherein the drive train includes 6 gears for transferring power to all legs.

6. The robot of claim 1, wherein the phase of the legs is offset based on four-legged motion.

7. The robot of claim 1, wherein each drive link is offset by 90 degrees from the other drive links.

8. The robot of claim 1, where drive links are offset such that when a first drive link of a first leg is at −90 degrees from horizontal, a second drive link for a second leg is at +90 degrees from horizontal, a third drive link of a third leg is at 0 degrees from horizontal and a fourth drive link for a fourth leg is at +180 degrees from horizontal.

9. The robot of claim 1, wherein the body comprises assembly holes therethrough allowing for a pin to pass therethrough to couple one of the legs to one of the drive links.

10. The robot of claim 1, wherein each leg includes six links and seven joints.

11. The robot of claim 1, wherein each leg includes five joints.

12. The robot of claim 1, wherein the unitary structure includes the drive link of each leg.

13. The robot of claim 1, wherein the joints include a distal-most joint and one of said links comprising a foot, wherein a path of a point on the distal-most joint is defined by a radius factor of one of said ground joints and one of said joints between said one of said ground joints and the distal-most joint.

14. The robot of claim 1, wherein the joints comprise a plurality of revolute joints.

15. The robot of claim 14, wherein the links comprise material that is 50% more rigid than material of the joints.

16. The robot of claim 15, wherein Shore A of the drive link material is a 50A and Shore A of the joint material is 27A.

17. The robot of claim 16, wherein the drive links comprise Polyjet Flex 50A and the joints comprise Polyjet Flex 27A.

18. The robot of claim 1, wherein, for each leg, the joints comprise the input joint, a second joint, a third joint, a fourth joint, a fifth joint, a sixth joint and a seventh joint, and wherein the links comprise the drive link between the input joint and the second joint, a second link (D1) between the second joint and the third joint, a third link (D2) between the third joint and the seventh joint, a fourth link (D3) between the fourth joint and the third joint, a fifth link (D4) between the fifth joint and the sixth joint; a sixth link (D5) between the sixth joint and the seventh joint; and a seventh link (D6) extending from the seventh joint.

19. The robot of claim 18, wherein the fourth joint is offset vertically from the input joint by a distance D7 and offset laterally from the input joint by a distance D8, where D8>D7.

20. The robot of claim 18, wherein the drive link has a length D0, the second link has a length D1, the third link had a length D2, the fourth link has a length D3, the fifth link has a length D4, the sixth link has a length D5 and the seventh link has a length D6.

21. The robot of claim 20, wherein D0<D3<D4<D2<D5<D1<D6.

22. The robot of claim 18, wherein the third joint, the sixth joint and the seventh joint couple movable links.

23. The robot of claim 22, wherein a force angle $\phi$ and a desired joint angle $\theta_0$ for each of the third joint, the sixth joint and the seventh joint are functions of the difference between the respective links coupled therebetween.

\* \* \* \* \*